Sept. 15, 1964
F. S. CAMPBELL
3,149,226
GLIDE SLOPE MEMORIZING APPARATUS
Filed May 10, 1963
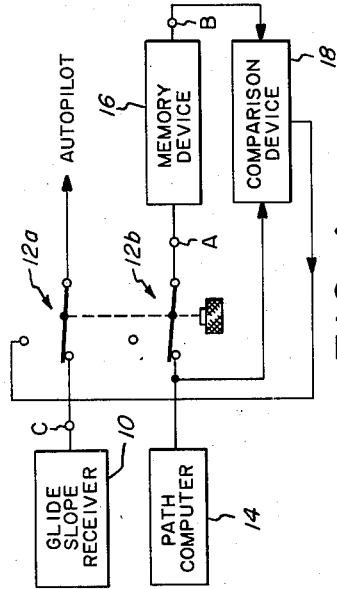
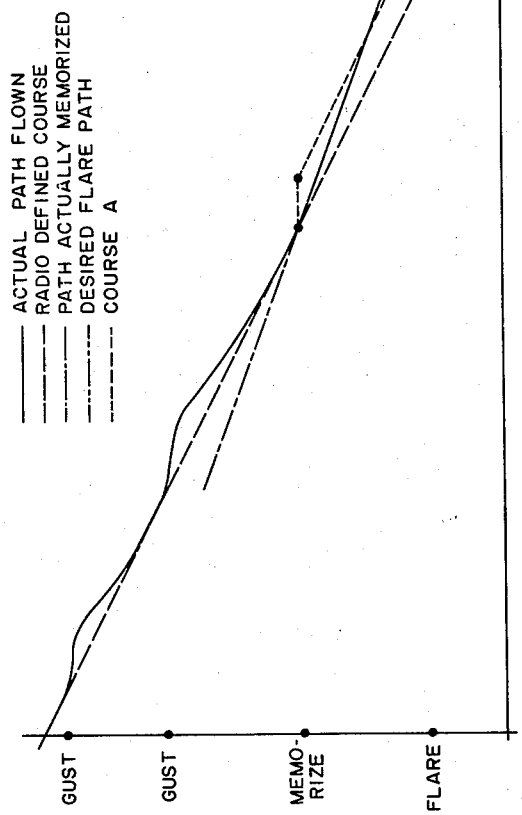
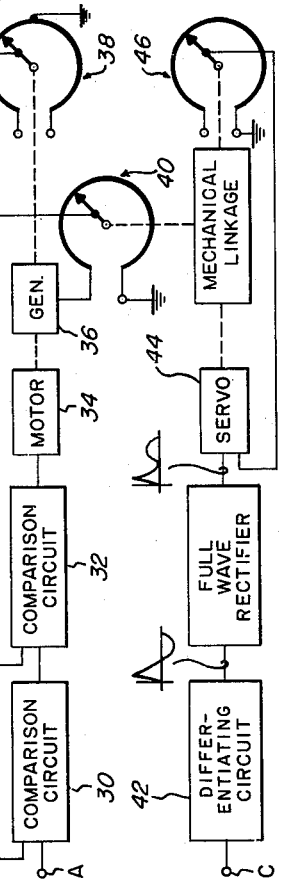
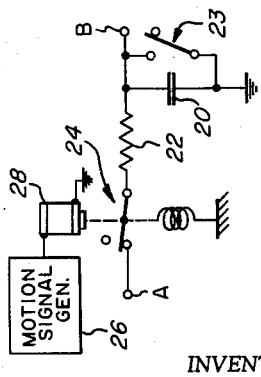
INVENTOR.
FRANCIS S. CAMPBELL
BY
ATTORNEY

United States Patent Office 3,149,226
Patented Sept. 15, 1964

3,149,226
GLIDE SLOPE MEMORIZING APPARATUS
Francis S. Campbell, Commack, N.Y., assignor to Sperry Rand Corporation, Great Neck, N.Y., a corporation of Delaware
Filed May 10, 1963, Ser. No. 279,455
8 Claims. (Cl. 235—151)

This invention relates in general to aircraft landing control systems and in particular provides an improved memory circuit for storing a signal accurately representative of the craft approach to the ground while flying a radio-defined course.

As is known, the radio beam defining the glide path, as provided by the Instrument Landing System (ILS), is generally wedge-shaped, being narrow and very noisy at low altitudes and therefore difficult, if not impossible, to use during the final seconds of the landing maneuver. To overcome these limitations, the prior art, e.g. the system disclosed in U.S. Patent 3,052,427, filed in the name of Match et al. and assigned to the present assignee, has provided for the storing or memorizing of a signal representing controlled flight along the radio-defined path when such control is reliable. Then, prior to the time when radio control starts to get erratic, control of the craft descent is switched from "radio" to control in accordance with a signal representing the memorized path, i.e. by continually equating a signal representing the actual glide path to a signal representing the memorized path an error signal is produced, which on being applied to the craft automatic pilot causes the craft to continue generally along the radio-defined path.

Extending controlled flight toward the ground by the above-described technique presupposes that the stored or memorized signal is truly representative of flight along the radio-defined path when the craft is under radio control, for should the stored signal be not so representative the craft will be caused to fly toward the ground along either a too steep or a too shallow course, causing respectively short and long touchdowns.

As has oftentimes happened, spurious disturbances, e.g. as might be had by wind gusts and bends or kinks in the radio beam along its length, cause the craft to depart periodically away from the defined course. For memory circuits with long time constants these disturbances, if asymmetrical about the defined course and frequent enough, can cause the stored signal to represent a course different from the radio-defined course, i.e. circuit lags will prevent instantaneous correction of the stored signal as the craft repeatedly corrects for the disturbances themselves, such difference being in proportion to the average of the craft standoff from the radio-defined course. Decreasing the memory circuit time constant, i.e. decrease the memory circuit lag so that it always stores a signal representing the instantaneous craft flight path, while compensating for the problem described immediately above, poses a different problem: Were the craft to experience a disturbance (which the memory circuit can follow and which the craft itself cannot completely and immediately correct for) at or very near the altitude at which craft control is switched from "radio" to "memory," the memory circuit would store again a signal representing a path different from the radio defined path.

By means of the invention, a memory circuit employed as described above is made to store a signal truly representative of the radio-defined path, substantially regardless of the way the craft is disturbed as it flies under radio control. That is, when the craft is on the beam and not experiencing any path disturbances (or only long duration low frequency ones which the craft itself can easily correct for, the memory circuit works to store a signal representing the instantaneous path and has a short time constant; in the presence of gust-like disturbances though the memory circuit operation is modified: In one form of the invention, the memory circuit is disabled when the craft starts to move appreciably with respect to, and not along, the radio-defined course. Therefore, in this form of the invention the memory circuit must store either the correct path signal, or no signal at all, and once having acquired the correct path signal, it holds it. In a second form of the invention (the presently preferred form), the memory circuit is never completely disabled, but has instead its time constant varied as an inverse function of the rate that the craft departs from the radio-defined course. Therefore, depending on how short or abrupt path disturbances (high frequency craft motion) are, the memory circuit time constant is increased accordingly so that the memory circuit will always be unable to follow and store signals representing them, these disturbances being such as to be not easily and quickly corrected for by the craft itself; for easily corrected for path disturbances, the memory circuit time constant is desirably kept low.

A principal object of the invention is to provide an improved circuit for use in a landing control system.

Another object of the invention is to provide an improved circuit for memorizing a signal representing a craft landing approach path while flying under control of the Instrument Landing System.

Another object of the invention is to provide a course memorizing circuit that essentially ignores disturbances that drive a craft away from a defined course while said craft is being controlled to move along such course.

The invention will be described with reference to the figures wherein:

FIG. 1 is a general block diagram of a landing control system endeavored to be improved by means of the present invention, FIG. 2 is a diagram showing a landing profile useful in describing the present invention, FIG. 3 is a diagram showing apparatus embodying one form of the invention, and FIG. 4 is a block diagram of a presently preferred embodiment of the invention.

Referring to FIG. 1 a conventional aircraft landing control system improved by means of the invention has a glide slope receiver 10 which provides an output error signal representing the angular displacement of an aircraft from the axis of a radio-defined path as might be provided by the Instrument Landing System. At appreciable altitudes where the aforesaid error signal is reliable, it is applied through a switch 12a to the craft autopilot (not shown) for corrective action in the event the craft departs from the defined course. As was stated earlier, the glide slope receiver 10 error signal results in erratic control of the craft below a certain altitude. Accordingly, at or slightly above this altitude the switch 12a is operated and moved to its upper position (either manually or automatically), thereby removing the glide slope receiver 10 error signal from the craft automatic pilot.

While under control of a reliable glide slope receiver 10 error signal, a path computer 14, e.g. a craft rate of descent or flight path angle computer (see for example U.S. Patent 3,077,557), applies its output signal to a memory device 16 through a switch 12b ganged to operate with the switch 12a. The memory device 16 may simply be a capacitor. In addition to applying its output signal to the memory device 16, the path computer 14 applies a signal to a comparison device 18, which also receives the signal stored by the memory device 16 and therefore provides no output signal so long as the signals applied to it are identical. The comparison device output signal, if any, is applied to the upper contact of the switch 12a.

In operation, the circuit of FIG. 1 applies the glide slope receiver 10 output signal to the craft autopilot to control the craft as it descends down the radio-defined glide path. During this time the path computer 14 applies to the memory device 16 a signal representing the manner in which the craft is descending down the glide path, the error signal applied to the upper contact of the switch 12a being continually driven to zero. At the altitude where the glide slope receiver 10 error signal ceases to provide reliable craft control, the switches 12a and 12b are moved to their upper positions, thereby causing the path computer 14 output signal to cease being applied to the memory device 16 (and as a result the memory device 16 holds the signal it had at the instant the switch 12b moved to its upper position) and the comparison device 18 output signal to be applied through the switch 12a to the craft autopilot, instead of the glide slope receiver 10 output signal being applied thereto. Hence, control of the craft below the "switching" altitude is continued by comparing the instantaneous path signal with the memorized path signal. This causes the craft autopilot to make the craft fly an extension of the radio-defined path below the point at which reliable direct radio contact is ended.

Refer now to the landing profile of FIG. 2, and assume for simplicity that the memory device in the circuit of FIG. 1 is a capacitor having a substantial charge time (large time constant): If the craft is repeatedly driven one way, as shown, away from the defined course by wind gusts, the capacitor-memory will gradually lose charge to memorize a signal representing a path (a shallower one) that is different from the radio-defining path. For example, on receipt by the craft of the first gust, the capacitor starts to discharge, and partially does; as soon, however, as the capacitor tries to recharge, the craft is hit by another gust to cause again the capacitor to discharge. As a result of such repeated gusts, the capacitor eventually discharges to a quiescent level representative of a course that is shallower than the radio defined course. Therefore, at the altitude at which craft control is switched to MEMORIZE, the craft will depart from the radio-defined path and proceed down to a flare altitude along an "actually memorized" path which is not coincidental with the radio-defined path. While flare control admittedly serves no part of the invention, FIG. 2 shows the effect through flare of memorizing too shallow a course, i.e. FIG. 2 shows a substantial error in the point at which the craft actually touches down and the place where it should touch down.

Decrease in the charge time of the FIG. 1 capacitor-memory so that it always stores a signal representing the instantaneous path of the craft has its own shortcomings as referred to above: For example, in the extreme case where a gust or other disturbance occurs right at the altitude at which control is switched to MEMORIZE, driving the craft parallel to the ground, the instantaneous path signal memorized will be such as to prevent the craft from ever touching down. With the present invention, the craft, after a gust occurring at the MEMORIZE altitude, will fly COURSE A and have the relatively small touchdown error E; for gusts occurring above the MEMORIZE altitude, the craft (below the MEMORIZE altitude) will fly only the radio-defined course, assuming of course that the craft is on the radio-defined course at the MEMORIZE altitude and can hold such course below that altitude.

In FIG. 3, a simple form of the invention adapted to be connected to points A and B of FIG. 1 in place of the memory device 16 consists of a signal storing capacitor 20 which is adapted to store or memorize the path signal appearing at contact A, and which is applied through a small resistor 22 and a normally closed switch 24. The capacitor 20 therefore has a small charge time and substantially instantaneously stores the signal appearing on contact A. The switch 24 is operated (opened) by actuation of a relay 28 which in turn is energized by a signal from a motion signal generator 26, e.g. a device (a time differentiator of the signal from the receiver 10) that produces a signal representing motion with respect to, and not along, the radio-defined course. Therefore, so long as the craft moves with respect to the radio-defined course, the switch 24 is held open; once the craft flies along the defined course though, the capacitor 20 stores a signal representing that course, and no other (i.e. until a discharging switch 23 is closed, for example, after the landing maneuver is completed, after which time any new signal may be stored). The relay 28 has a certain pull-in threshold level so that it will not actuate in respone to beam noise and other small signal level disturbances.

In FIG. 4, the presently preferred form of the invention consists of an electromechanical memory circuit and an electromechanical circuit for modifying the operation of such memory circuit. The memory circuit of FIG. 4, like the circuit of FIG. 3, is adapted to be connected to FIG. 1 points A and B in place of the prior art memory device 16. In addition, the "memory" modifying circuit of FIG. 4 is adapted to receive the signal appearing at point C of FIG. 1. The path computer 14 output signal, e.g. a rate of descent signal, is applied to a comparison circuit 30, the output of which is applied to a second comparison circuit 32 adapted to receive a damping signal, the form of which will be described below. The comparison circuit 32 output signal is applied to drive a servo motor 34 which in turn drives a generator 36 and the wiper of a potentiometer 38. The generator 36 output signal is applied across a potentiometer 40, the wiper of which is connected to apply the aforesaid damping signal to the comparison circuit 32 to rate-damp the operation of the motor 34. Therefore, the gain (or time constant) of the servo loop consisting of elements 30, 32, 34, 36 and 38 is dependent on the position of the wiper of the potentiometer 40: when the wiper is rotated clockwise (toward ground) substantially no rate feedback signal is provided and the servo loop gain is high, which of course means it has a short time constant; when the potentiometer 40 wiper is rotated counterclockwise (away from ground) the servo gain is low and the servo has a long time constant. The wiper of the potentiometer 38, by being driven in accordance with the path signal, moves to such a position as to provide a cancelling feedback signal to the comparison circuit 30 and has, therefore, on it a signal representing the signal appearing at contact A, such signal being the memorized path signal.

The signal appearing at contact C of FIG. 1 is applied to a differentiating circuit 42 which changes the glide slope receiver 10 beam displacement signal to a signal representing the craft rate of approach to and from the defined course. The course rate signal appearing at the output of the differentiating circuit 42 is applied through a full wave rectifier (which converts the phase sensitive differentiating circuit output signals to signals of a single phase, since degree of movement with respect to the defined course, and not direction with respect thereto, is all that matters in this embodiment) to a position servo 44 which drives to position both the wiper of the potentiometer 40 and the wiper of a potentiometer 46, such potentiometer 46 providing a feedback signal for cancelling the signal appearing at the input to the servo 44.

For course rate signals appearing at the output of the circuit 42, the wiper of the potentiometer 40 is driven proportionately counterclockwise (thereby making the loop consisting of elements 30, 32, 34, 36 and 38 sufficiently low gain and providing it with a sufficiently long time constant) so that the wiper of the potentiometer 38 will always remain substantially still when path disturbance signals appear at point A.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for use in an aircraft landing control system comprising first means for receiving and storing a signal representing the instantaneous path of said aircraft, second means for producing a signal indicative of craft movements to and from a defined glide path, and third means adapted to receive the output signal from the second means to decrease the ability of said first means to follow and store the instantaneous path signal in proportion to the magnitude of said second means output signal, whereby the first means is substantially assured of storing a signal representing the defined glide path when said craft attempts to fly that path.

2. The apparatus of claim 1 wherein said first means receives and stores a signal representing the flight path angle of said craft.

3. The apparatus of claim 1 wherein said first means receives and stores a signal representing the craft rate of descent.

4. The apparatus of claim 1 wherein said first means receives and stores a signal representing the craft rate of descent, and wherein said second means produces a signal representing craft rate of approach to and from the defined glide path.

5. Signal memorizing apparatus for use in an aircraft landing control system comprising first means adapted to receive and store continually a signal representative of the instantaneous path of said aircraft, second means for producing a signal representative of craft motion with respect to a defined glide path, and third means adapted to receive said motion signal to increase the time constant of said first means when said second means produces a motion signal, whereby said first means is unable to follow and store signals representing spurious path changes of the craft with respect to the defined course.

6. Signal memorizing apparatus for use in an aircraft landing control system comprising first means adapted to receive and store continually a signal representative of the instantaneous path of said aircraft, second means for producing a signal representative of craft motion with respect to a defined glide path, and third means adapted to receive said motion signal to vary the time constant of said first means as an inverse function of the output signal from said second means, whereby said first means is unable to follow and store signals representing spurious path changes of the craft with respect to the defined course.

7. The apparatus of claim 6 wherein said second means produces a signal representing the craft rate of approach to and from said defined path.

8. In an aircraft landing control system having a memorizing circuit for storing a signal representing the path of an aircraft above a predetermined altitude, apparatus comprising means for producing a signal representative of craft motion with respect to a defined course, and means adapted to receive the craft motion signal being responsive to that signal to increase and decrease the ability of said memorizing circuit to follow changes in the path signal when the craft motion signal respectively decreases and increases.

References Cited in the file of this patent
UNITED STATES PATENTS
2,987,275    Moncrief-Yeates _____ June 6, 1961